(12) United States Patent
Saito

(10) Patent No.: US 11,146,098 B2
(45) Date of Patent: Oct. 12, 2021

(54) PRECHARGE CONTROL APPARATUS

(71) Applicant: DENSO CORPORATION, Aichi (JP)

(72) Inventor: Kohei Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 80 days.

(21) Appl. No.: 16/783,474

(22) Filed: Feb. 6, 2020

(65) Prior Publication Data
US 2020/0274385 A1 Aug. 27, 2020

(30) Foreign Application Priority Data
Feb. 22, 2019 (JP) .............................. JP2019-030737

(51) Int. Cl.
*H02J 7/00* (2006.01)
*H02J 7/34* (2006.01)

(52) U.S. Cl.
CPC ............ *H02J 7/345* (2013.01); *H02J 7/0069* (2020.01); *H02J 7/007182* (2020.01)

(58) Field of Classification Search
None
See application file for complete search history.

(56) References Cited

U.S. PATENT DOCUMENTS

| 7,061,979 B1* | 6/2006 | Chin | G01R 23/09 329/312 |
| 2006/0082394 A1* | 4/2006 | Briskin | H03K 5/153 327/77 |
| 2008/0185999 A1 | 8/2008 | Matsukawa et al. | |
| 2013/0106320 A1* | 5/2013 | Yugo | H02J 1/08 318/139 |
| 2016/0118135 A1* | 4/2016 | Dutta | G11C 11/5642 365/185.03 |
| 2018/0131342 A1* | 5/2018 | Zamprogno | H03F 3/45475 |

FOREIGN PATENT DOCUMENTS

| JP | H10-304501 A | 11/1998 |
| JP | 2004-120866 A | 4/2004 |
| JP | 2005-269742 A | 9/2005 |

* cited by examiner

*Primary Examiner* — Arun C Williams
(74) *Attorney, Agent, or Firm* — Posz Law Group, PLC

(57) ABSTRACT

A precharge control apparatus starts precharge of a capacitor. The precharge is determined to be completed when a set time has elapsed since a voltage difference between a battery voltage and a capacitor voltage detected by a voltage sensor becomes equal to or less than a set voltage. The set voltage is based on a maximum error obtained by adding maximum values of detection errors of the battery voltage and capacitor voltage by the voltage sensor. The set time is based on a time from when the voltage difference becomes twice the maximum error to when the voltage difference becomes equal to or less than a withstand voltage of a main contactor, under states where the precharge causes the capacitor voltage to increase with a time constant when a resistance value of a resistor and a capacitance of the capacitor each are largest within an allowable error.

5 Claims, 5 Drawing Sheets

PRECHARGE CONTROL APPARATUS

CROSS REFERENCE TO RELATED APPLICATION

The present application claims the benefit of priority from Japanese Patent Application No. 2019-30737 filed on Feb. 22, 2019. The entire disclosure of the above application is incorporated herein by reference.

TECHNICAL FIELD

The present disclosure relates to a precharge control apparatus configured to precharge a smoothing capacitor connected in parallel to a load before closing a main contactor that conducts a power supply path from a battery to a load.

BACKGROUND

There is known a precharge control apparatus that includes (i) a main contactor in a power supply path from a battery to a load, and (ii) a precharge contactor connected in parallel to the main contactor and forming a power supply path via a current limiting resistor.

When the power supply from the battery to the load is started, the precharge contactor is closed to start the precharge to the smoothing capacitor connected in parallel to the load. In addition, after starting the precharge, when the voltage difference between the battery voltage and the capacitor voltage becomes equal to or less than a predetermined threshold voltage, it is determined that the precharge is completed, to thereby close the main contactor to permit the drive of the load.

In this way, the capacitor is precharged when starting the power supply from the battery to the load. The precharge of the capacitor is intended to suppress the inrush current that flows when the main contactor is closed, so as to protect the main contactor. Thus the threshold voltage is set to be the withstand voltage of the main contactor or a voltage less than the withstand voltage.

SUMMARY

According to an example of the present disclosure, a precharge control apparatus is provided as follows. In the precharge control apparatus, precharge of a capacitor is started. The precharge of the capacitor is determined to be completed when a set time has elapsed since a voltage difference between a battery voltage and a capacitor voltage detected by a voltage sensor becomes equal to or less than a set voltage. The set voltage is set based on a maximum error obtained by adding maximum values of detection errors of the battery voltage and capacitor voltage by the voltage sensor. The set time is set based on a time from when the voltage difference becomes twice the maximum error to when the voltage difference becomes equal to or less than a withstand voltage of a main contactor, under states where the precharge causes the capacitor voltage to increase with a time constant when a resistance value of a resistor and a capacitance of the capacitor each are largest within an allowable error.

BRIEF DESCRIPTION OF DRAWINGS

The objects, features and advantages of the present disclosure will become more apparent from the following detailed description made with reference to the accompanying drawings. In the drawings.

DETAILED DESCRIPTION

Hereinafter, embodiments of the present disclosure will be described with reference to the drawings.

Embodiment

Configuration

Figure 1:
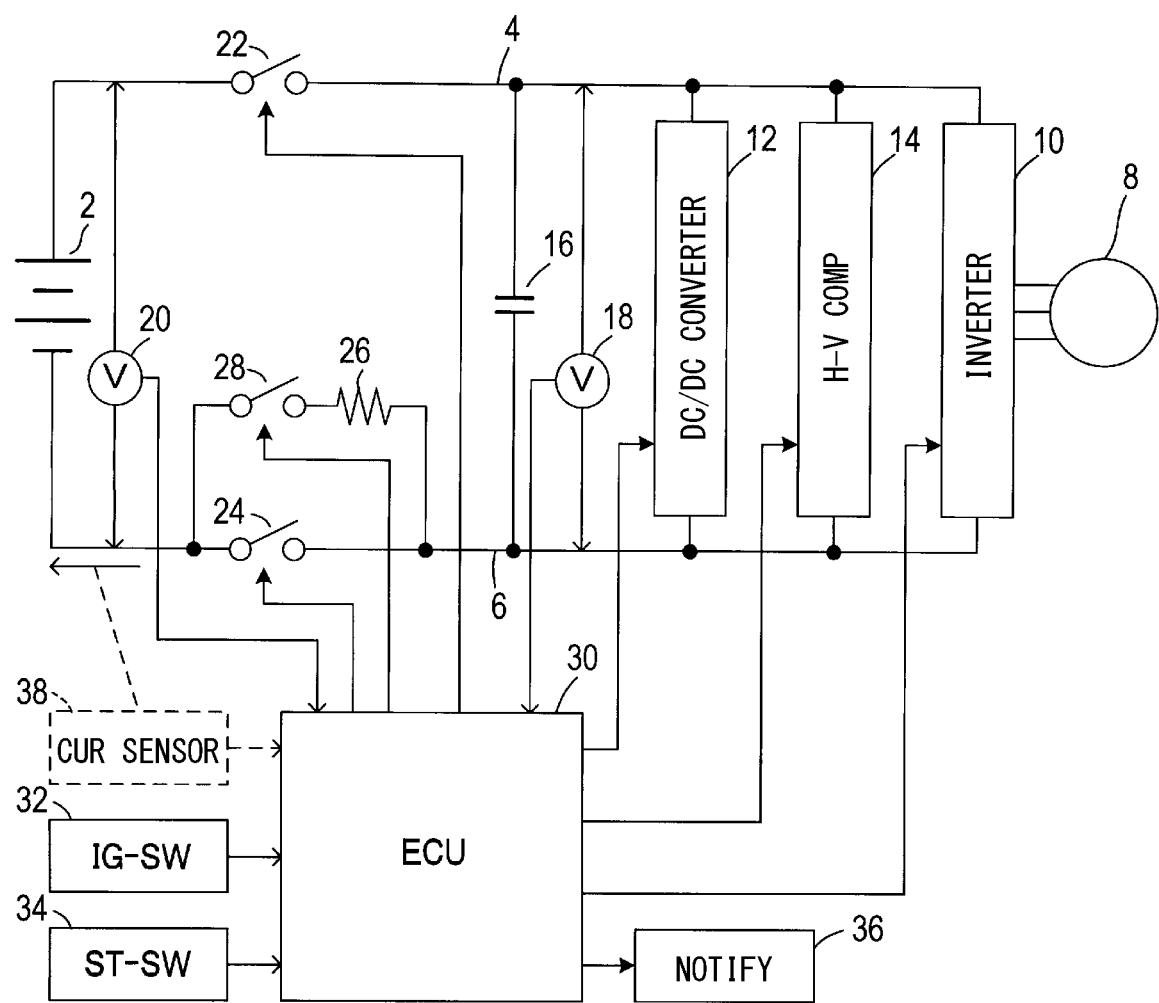
FIG. 1 is an explanatory diagram showing an overall configuration of a power supply system for vehicles according to an embodiment.

A power supply system of the present embodiment shown in FIG. 1 is configured to supply electric power from a battery 2 mounted on an electric vehicle or hybrid vehicle in a vehicle to an inverter 10 or the like; the inverter is to control energization to a motor 8 serving as a power source of the vehicle via power supply paths 4 and 6 on the positive electrode side and the negative electrode side.

In addition to the inverter 10, other loads are connected to the power supply paths 4 and 6 on the positive electrode side and the negative electrode side. Such other loads include (i) a DC/DC converter 12 that converts a high voltage (for example, 250 V) supplied from the battery 2 into a predetermined low voltage (for example, 12 V) and (ii) a high-voltage component 14.

Further, (i) a smoothing capacitor 16 that absorbs voltage fluctuations between the power supply paths 4 and 6 and (ii) a voltage sensor 18 that detects the voltage across the capacitor (hereinafter referred to as capacitor voltage Vc) are also provided to be connected to the power supply paths 4 and 6 on the positive electrode side and the negative electrode side, in parallel to the loads 10 to 14.

Further, a positive electrode side contactor 22 and a negative electrode side contactor 24 are provided respectively for conducting and blocking the power supply paths 4 and 6 on the positive electrode side and the negative electrode side from the battery 2 to the loads 10 to 14 including the capacitor 16.

Therefore, the loads 10 to 14 including the capacitor 16 are supplied with a high voltage from the battery 2 by closing the two contactors 22 and 24 and making the power supply paths 4 and 6 conductive.

Of these two contactors 22 and 24, a precharge contactor 28 is connected in parallel to the contactor 24 on the negative electrode side via a current limiting resistor 26. In the present embodiment, the contactor 24 on the negative electrode side may be also referred to as a main contactor, a first main contactor; and contactor 22 on the positive electrode side may be also referred to as a different main contactor or a second main contactor. In the following description, the contactor 22 on the positive electrode side is referred to as SMR-B 22, the contactor 24 on the negative electrode side is referred to as SMR-G 24, and the precharge contactor 28 is referred to as SMR-P 28. SMR represents a System Main Relay. Moreover, the resistor 26 can be configured by resistance elements, such as a resistor unit, or the conductive wire which has predetermined electrical resistance.

The SMR-P 28 is for precharging the capacitor 16 by supplying a charging current to the capacitor 16 by forming a power supply path via the resistor 26 at the time of starting the power supply system. The SMR-P 28 along with the SMR-B 22 and the SMR-G 24 is switched on and off by an ECU (Electronic Control Unit) 30 as a controller.

As an example of the present embodiment, the ECU 30 is configured by a microcomputer including a CPU, a ROM, and a RAM. The ECU 30 operates by receiving power supply from a low voltage battery mounted on the vehicle when an ignition switch (hereinafter referred to as IG-SW) 32 of the vehicle is in an on state.

Figure 2:
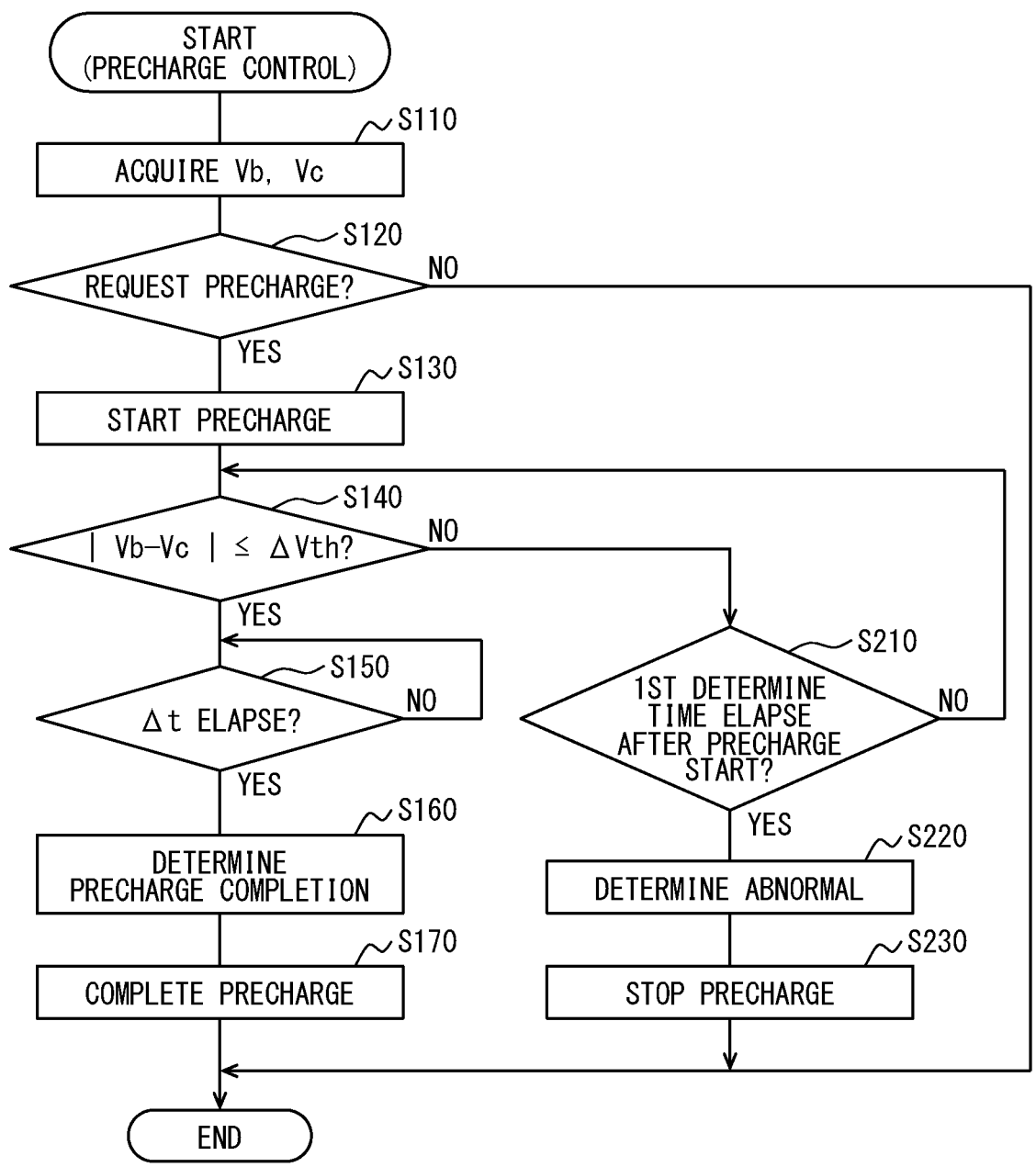
FIG. 2 is a flowchart showing a precharge control process executed by an ECU.

Further, the ECU 30 assumes that when a starter switch (hereinafter referred to as ST-SW) 34 of the vehicle is operated while the IG-SW 32 is in an on state, an activation command is input to the power supply system. The precharge control process shown in FIG. 2 is thereby executed.

Note that the low voltage battery serving as the power source of the ECU 30 is charged by the low voltage generated by the DC/DC converter 12, so that the low voltage battery is not discharged and the ECU 30 is not disabled.

Next, in addition to the voltage sensor 18, the IG-SW 32, and ST-SW 34 described above, the voltage sensor 20, and the notification unit 36 are connected to the ECU 30. Here, the voltage sensor 20 is configured to detect an output voltage from the battery 2 (hereinafter, battery voltage Vb).

In addition, the notification unit 36, which is for notifying the passenger when an abnormality is detected in the precharge control process described later, includes an alarm sound generating unit (i.e., an alarm) that generates an alarm sound, a display that displays abnormal contents, and the like.

The ECU 30 functions as a controller (control circuit) of the present disclosure by executing the precharge control process shown in FIG. 2. In the precharge control process, the SMR-P 28 and SMR-B 22 are closed to start precharging the capacitor 16. In response to that the completion of precharge is determined after the start of precharge, the SMR-G 24 is closed and the SMR-P 28 is opened while the SMR-B 22 is maintained to be closed. This permits supply power with low loss to the loads 10 to 14 via the power supply paths 4 and 6. Further, the determination of the precharge completion (i.e., precharge completion determination) is performed based on the capacitor voltage Vc and the battery voltage Vb detected by the voltage sensors 18 and 20, respectively.

Precharge Control Process

Next, a precharge control process executed by the ECU 30 will be described.

As shown in FIG. 2, when the precharge control process is started, first, in S110, the battery voltage Vb and the capacitor voltage Vc are acquired from the voltage sensors 20 and 18. In subsequent S120, it is determined whether or not precharge of the capacitor 16 is requested.

If no precharge is requested, the precharge control process is ended. If the precharge is requested, the process proceeds to S130, and the SMR-P 28 and SMR-B 22 are closed to start the precharge to the capacitor 16.

As the precharge is started in S130, it is determined in S140 whether the absolute value (|Vb−Vc|) of the voltage difference between the battery voltage Vb and the capacitor voltage Vc acquired in S110 is equal to or less than a preset set voltage ΔVth.

If |Vb−Vc| is equal to or less than the set voltage ΔVth, the process proceeds to S150, where it is determined whether or not a preset set time ΔT has elapsed. The process waits for the set time ΔT to elapse; when the set time ΔT elapses, the process proceeds to S160.

Figure 3:
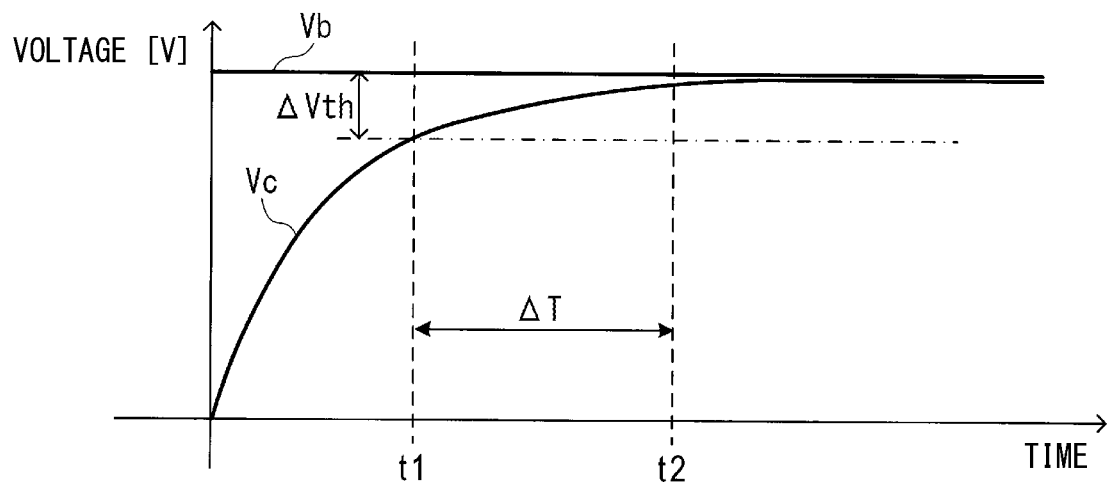
FIG. 3 is a time chart showing a precharge completion determination operation.

In S160, as shown in FIG. 3, the set time ΔT has elapsed (time point t2) since the absolute value |Vb−Vc| of the voltage difference becomes equal to or less than the set voltage ΔVth (time point t1). It is thus determined that the precharge is completed, and the process proceeds to S170.

In S170, the SMR-G 24 is closed to make the negative electrode side power supply path 6 conductive, allowing the loads 10 to 14 to be driven, and the precharge control process is ended. In S170, after SMR-G 24 is closed, SMR-P 28 is opened.

Figure 5:
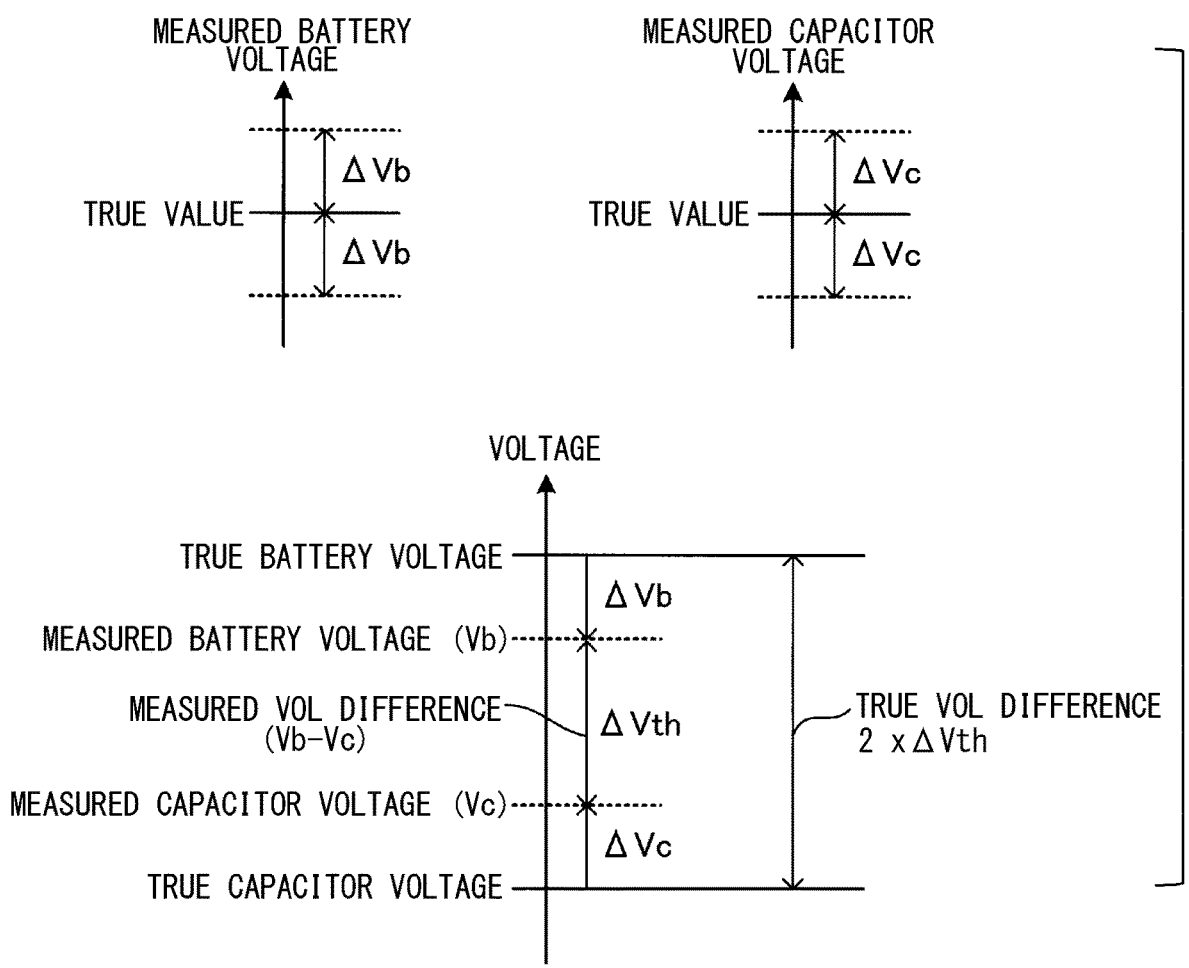
FIG. 5 is an explanatory diagram showing a relationship between a set voltage and a voltage measurement error by a voltage sensor.

As described above, in the present embodiment, the precharge completion determination is performed using the set voltage ΔVth and the set time ΔT. Here, as shown in FIG. 5, the set voltage ΔVth is set to be a maximum error (ΔVb+ΔVc) obtained by adding the maximum detection errors ΔVb and ΔVc of the battery voltage Vb and the capacitor voltage Vc by the voltage sensors 20 and 18.

Figure 4:
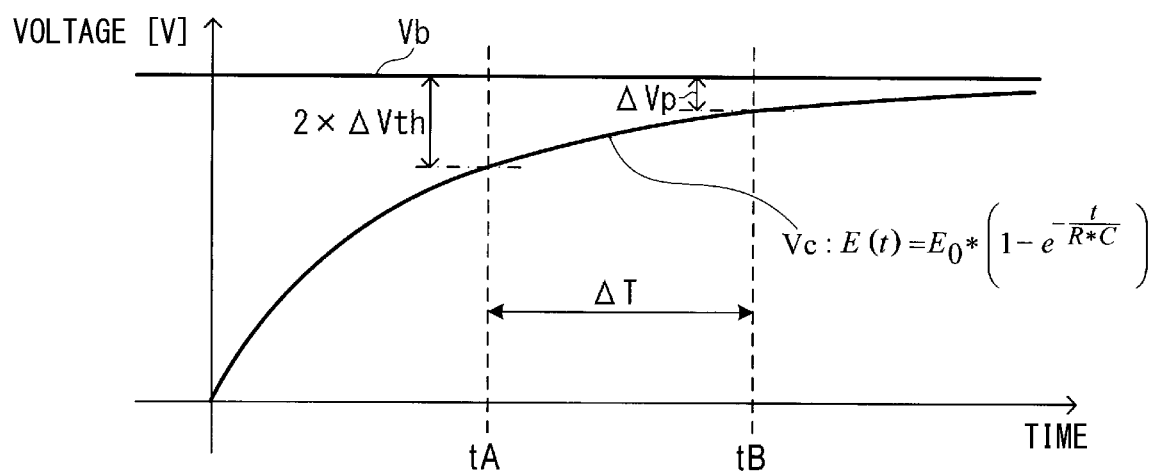
FIG. 4 is a time chart showing an operation for setting a set time used for precharge completion determination.

Also, as shown in FIG. 4, the set time ΔT is set on the assumption that the capacitor voltage Vc is slowly increased by the precharge with the time constant (R*C) when the resistance value R of the resistor 26 and the capacitance C of the capacitor 16 are the largest within the respective allowable errors.

That is, when precharging the capacitor 16 is being performed, the capacitor voltage Vc (=E) increases according to the following Expression 1.

$$E(t) = E_0 * (1 - e^{-\frac{t}{R*C}})$$ [Expression 1]

Under a state where the capacitor voltage Vc increases in this way, a time (i.e., period of time) is obtained from when the voltage difference (Vb−Vc) reaches a voltage value that is twice the set voltage ΔVth to when the voltage difference becomes equal to or less than the threshold voltage ΔVp. Here, the set voltage ΔVth corresponds to the maximum error. The obtained time is set as the set time ΔT.

The threshold voltage Vp is set to a withstand voltage of the SMR-G 24 or a voltage less than the withstand voltage to prevent the SMR-G 24 of the main contactor from failing due to the inrush current that flows when the SMR-G 24 is closed.

As a result, according to this embodiment, even in the case where the detection voltages by the voltage sensors 18 and 20, the resistance value of the resistor 26, and the capacitance of the capacitor 16 are varied to exhibit maximized errors within an allowable range, it can be determined that the voltage difference (Vb−Vc) becomes equal to or less than the threshold voltage ΔVp.

Therefore, according to the present embodiment, it is possible to more reliably determine the completion of the precharge than in a configuration which determines the completion of the precharge by comparing the voltage difference (Va−Vb) with the threshold voltage ΔVp.

Note that a voltage value that is twice the set voltage ΔVth being the maximum error (ΔVb+ΔVc) is used in setting the set time ΔT. The reason thereof is as follows. As shown in FIG. 5, suppose a case where the voltage difference between the true value of the battery voltage and the true value of the capacitor voltage is a voltage value (2×ΔVth) that is twice the set voltage ΔVth. In such a case, if the measurement errors ΔVb and ΔVc of the sensors 18 and 20 are maximum, the voltage difference between the measured values may become the set voltage ΔVth (=ΔVb+ΔVc).

For this reason, when it is determined in S140 that the absolute value of the voltage difference is equal to or less than the set voltage ΔVth, the actual voltage difference is twice the set voltage ΔVth (2×ΔVth), at a maximum.

Therefore, in this embodiment, after the start of precharge, the time from when the voltage difference (Vb−Vc) reaches a voltage value twice the set voltage ΔVth to when it becomes equal to or less than the threshold voltage ΔVp is set as the set time ΔT. As a result, it is possible to more reliably determine that the precharge is completed using the set voltage ΔVth and the set time ΔT, which serve as parameters.

Next, in the precharge control process, if it is determined in S140 that the absolute value (|Vb−Vc|) of the voltage difference between the battery voltage Vb and the capacitor voltage Vc is greater than the set voltage ΔVth, the process proceeds to S210.

In S210, it is determined whether or not a first determination time set in advance has elapsed since the start of the precharging. The first determination time is a time (i.e., a period of time) for determining that the capacitor 16 cannot be normally charged by precharging, and is set to be longer than the time required to perform the precharging in a normal state.

Therefore, if it is determined in S210 that the first determination time has not elapsed, the process proceeds to S140. If it is determined in S210 that the first determination time has elapsed, the process proceeds to S220.

In S220, it is determined that there is an abnormality in at least one of the voltage sensor 18, the voltage sensor 20, the positive power supply path 4, and the negative power supply path 6, or it is determined that there is an abnormality in taking out power by the loads 10 to 14. Such abnormality determination is stored in the memory; then, the process proceeds to S230.

In S230, all contactors (i.e., SMR-P 28, SMR-G 24, and SMR-B 22) are opened to be turned off, and the abnormality of the power supply system is notified through the notification unit 36. The precharge control process is ended.

Effects

As described above, after the ECU 30 starts precharging the capacitor 16, the voltage difference between the battery voltage and the capacitor voltage becomes equal to or less than the set voltage ΔVth, and then, the set time ΔT has elapsed at a time point. At this time point, it may be determined that precharge has been completed.

Therefore, the precharge completion determination can be properly performed even if there are variations in the detection accuracy of the voltage sensors 18 and 20 and the characteristics of the resistor 26 and the capacitor 16.

In addition, in order to properly perform the precharge completion determination, there is no need to select the main contactor SMR-G 24 having a high withstand voltage, or the voltage sensors 18 and 20 having a highly accurate with small detection errors. Therefore, the power supply system according to the present embodiment can be realized without increasing the cost.

In the present embodiment, when the completion of precharge cannot be determined even when the precharge execution time reaches the first determination time, any of the voltage sensors 18 and 20, the power supply paths 4 and 6, and the loads 10 to 14 is determined to be abnormal. Thus, the precharging is stopped.

This can suppress the battery 2 from being overdischarged due to discharging for a long time in the event of an abnormality. In addition, when precharge is canceled due to an abnormality, such an event is reported via a notification. The vehicle occupant can detect abnormality of the power supply system by the notification, and can quickly implement measures such as repair.

Modification Examples

While the embodiment of the present disclosure has been described, the present disclosure is not limited to the embodiment described above and can be modified in various manners as modification examples or other embodiments.

For example, in the above embodiment, in the precharge control process, when it is determined that the set time ΔT has elapsed in S150, it is determined that the precharge is completed in S160.

However, after the precharge starts, even if the set time ΔVth elapses after the voltage difference between the battery voltage Vb and the capacitor voltage Vc becomes equal to or less than the set voltage ΔVth, the capacitor 16 may not be fully charged.

Figure 6:
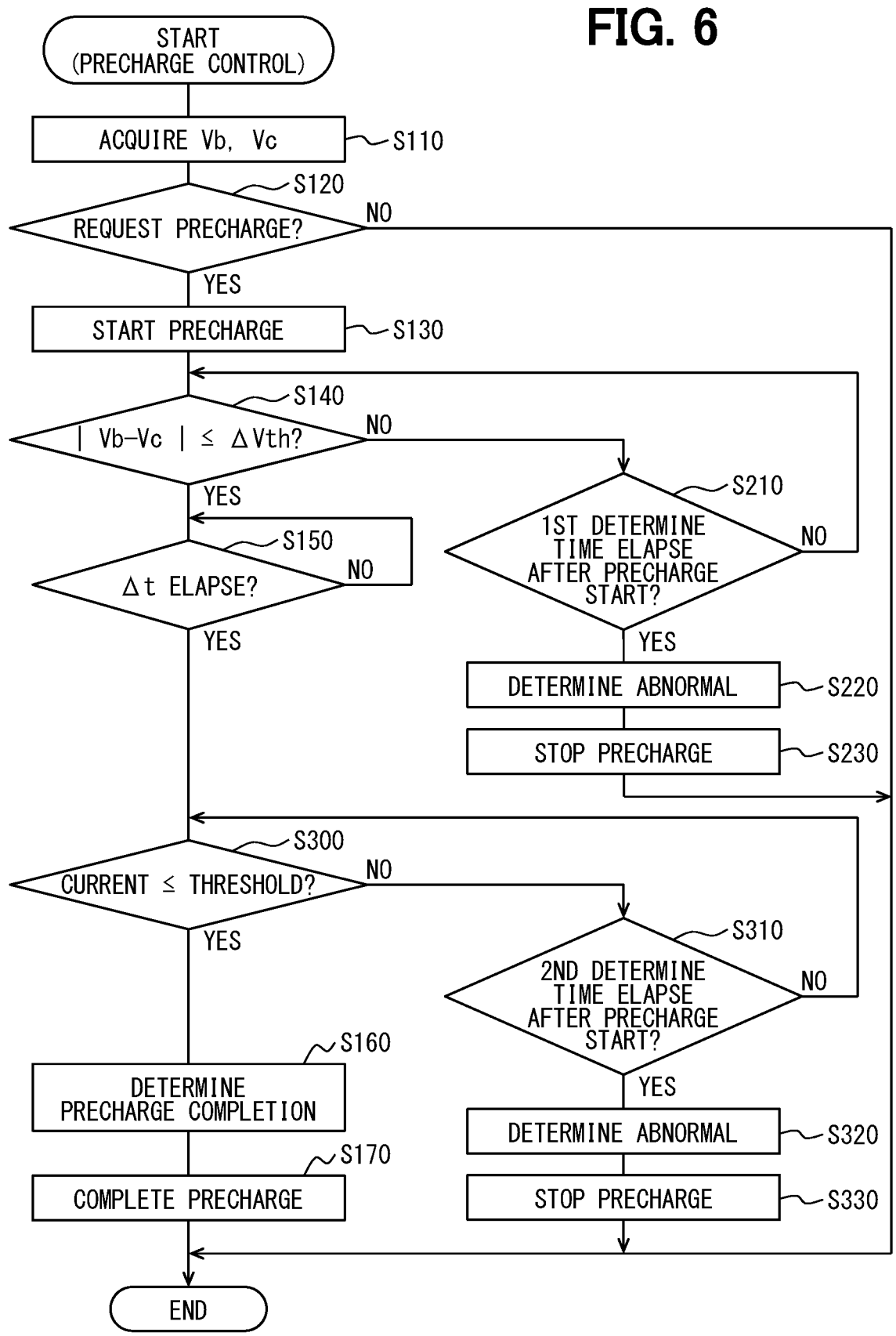
FIG. 6 is a flowchart showing a modification example of the precharge control process.

Therefore, as shown in FIG. 6, in the precharge control process, when it is determined that the set time ΔT has elapsed in S150, additional processing may be executed as follows. That is, in S300, it may be determined whether or not the current flowing from the battery 2 to the loads 10 to 14 via the power supply paths 4 and 6 is equal to or less than a threshold current.

The current flowing from the battery 2 to the loads 10 to 14 through the power supply paths 4 and 6 may be detected by a current sensor 38 indicated by a dotted line in FIG. 1. If it is determined in S300 that the current is equal to or less than the threshold current, the process proceeds to S160, and it is determined that the precharge is completed.

In S300, if it is determined that the current is greater than the threshold current, an unnecessary discharge current may flow from the battery 2 to the loads 10 to 14. The process thereby proceeds to S310, and it is determined whether or not the second determination time has elapsed after the start of precharging.

That is, in S310, it is determined whether or not a state in which a discharge current greater than the threshold current is flowing from the battery 2 towards the loads after the start of precharging has continued for the second determination time or longer. If the state has not continued for the second determination time or longer, the process proceeds to S300 again.

In addition, when the state has continued for the second determination time or longer, the process proceeds to S320. In S320, it is determined that there is an abnormality in taking out power due to a load, or an abnormality in the current sensor 38 that detects current. Such an occurrence of an abnormality is stored in the memory, and the process proceeds to S330.

In S330, all contactors (i.e., SMR-P 28, SMR-G 24, and SMR-B 22) are opened and turned off, and a notification is made which indicates that the loads 10 to 14 or the current sensor 38 are abnormal via the notification unit 36. The precharge control process then is ended.

Even if the voltage difference between the battery voltage Vb and the capacitor voltage Vc is equal to or less than the set voltage ΔVth, there may be an abnormality in taking out power by the loads 10 to 14. Such an abnormality may be detected based on the current flowing from the battery 2 to the loads 10 to 14 through the processing in S300 to S330.

Further, after the detection, the precharge can be stopped and the abnormality in the load 10 to 14 or the current sensor 38 can be informed of, so that the vehicle occupant can quickly implement measures such as repair.

Next, in the above embodiment, the set voltage ΔVth used for the precharge completion determination is set based on the maximum error obtained by adding the maximum detection errors ΔVb and ΔVc of the battery voltage Vb and the capacitor voltage Vc.

The maximum detection errors ΔVb and ΔVc of the voltages Vb and Vc used to set the maximum error may be the maximum detection errors ΔVb and ΔVc caused by the sensor alone due to the temperature characteristics, deterioration over time, product variations of the voltage sensors 20 and 18.

For example, suppose a case where the voltage sensors 20 and 18 are connected to the sensor ECU and the ECU 30 is configured to acquire the voltages Vb and Vc through communication with the sensor ECU. In such a case, each voltage Vb, Vc may have an error depending on the resolution of the voltage value during communication.

Therefore, in such a case, the maximum error used to set the set voltage ΔVth may be the maximum values ΔVb and ΔVc of detection errors generated by the sensor alone set by adding the errors of the voltages Vb and Vc generated by the resolution of the voltage value during communication.

Further, when charging from the battery 2 to the capacitor 16, a voltage drop occurs due to the charging current flowing in the charging path, so the difference (Vb−Vc) between the battery voltage Vb and the capacitor voltage Vc naturally includes this voltage drop.

For this reason, in order to compare with the true difference (Vb−Vc) without being affected by the voltage drop, the set voltage ΔVth may be set to a value which reflects the voltage drop which arises at the time of the charge to the capacitor 16 onto the maximum error as mentioned above.

Next, in the above embodiment, the main contactor to which the SMR-P 28 that is the precharge contactor is connected in parallel corresponds to the SMR-G 24 provided in the power supply path 6 on the negative electrode side.

On the other hand, the main contactor to which the SMR-P 28 is connected in parallel may be the SMR-B 22 provided in the power supply path 4 on the positive electrode side. In this case, precharging the capacitor 16 may be performed by turning on the SMR-P 28 and SMR-G 24; the SMR-B 22 may be turned on after the precharge completion determination. The same effect as the above embodiment can be obtained.

In the above embodiment, the SMR-B 22 and the SMR-G 24 serving as main contactors are provided in both the power supply path 4 on the positive electrode side and the power supply path 6 on the negative electrode side, respectively. One of them is provided with a precharge contactor SMR-P 28.

However, the technology of the present disclosure may be a system in which a main contactor and a precharge contactor are provided only in one of the two power supply paths 4 and 6 on the positive electrode side and the negative electrode side. The same effect can be obtained by applying in the same manner as the above embodiment.

In the above embodiment, the ECU 30 as the controller is configured by a microcomputer, and the function as the controller is realized by a precharge control process executed by the ECU 30 (i.e., a computer program). On the other hand, the controller of the present disclosure may be configured so that some or all of functions may be realized using a plurality of hardware circuits.

That is, the controller may be configured to be (i) a central processing unit (CPU) along with memory storing instructions executed by the CPU, or (ii) a hardware circuit without the CPU, or (iii) both the hardware circuit and the CPU along with memory. In other words, an individual function of a plurality of functions provided by the controller may be achieved by (i) a central processing unit (CPU) along with memory storing instructions executed by the CPU, or (ii) a hardware circuit without the CPU, or (iii) both the hardware circuit and the CPU along with memory. Furthermore, the ECU 30 may be provided as one or more controllers. Furthermore, a controller may be also referred to as a processor.

Multiple functions of one element in the described above embodiments may be implemented by multiple elements, or one function of one element may be implemented by multiple elements. Further, multiple functions of multiple elements may be implemented by one element, or one function implemented by multiple elements may be implemented by one element. A part of the configuration of the above embodiments may be omitted. At least a part of the configuration of the above embodiments may be added to or replaced with another configuration of the above embodiments.

In addition to the precharge control apparatus used in a vehicle power supply system and the like, the present disclosure also provides various forms including a program for causing a computer to function as a controller of the precharge control apparatus, a non-transitory tangible storage medium such as a semiconductor memory in which the program is stored, and a precharge control method.

For reference to further explain features of the present disclosure, the description is added as follows.

There is known a precharge control apparatus that includes (i) a main contactor in a power supply path from a battery to a load, and (ii) a precharge contactor connected in parallel to the main contactor and forming a power supply path via a current limiting resistor.

When the power supply from the battery to the load is started, the precharge contactor is closed to start the precharge to the smoothing capacitor connected in parallel to the load. In addition, after starting the precharge, when the voltage difference between the battery voltage and the capacitor voltage becomes equal to or less than a predetermined threshold voltage, it is determined that the precharge is completed, to thereby close the main contactor to permit the drive of the load.

In this way, the capacitor is precharged when starting the power supply from the battery to the load. The precharge of the capacitor is intended to suppress the inrush current that flows when the main contactor is closed, so as to protect the main contactor. Thus the threshold voltage is set to be the withstand voltage of the main contactor or a voltage less than the withstand voltage.

In the above, each of the voltage sensors detecting the battery voltage and the capacitor voltage may have low accuracy; thereby the voltage difference between the detection results of the battery and capacitor voltages may involve an error greater than the threshold voltage. Such a case may pose an issue to fail to determine completion of precharge.

To preventing this issue, a main contactor and a voltage sensor needs to be selected to satisfy the requirement that the voltage difference between the battery voltage and the capacitor voltage when closing the main contactor is less than the threshold voltage, even if the error in the voltage difference is expected to be the maximum value.

For this purpose, it is necessary to select a main contactor having a high withstand voltage and a voltage sensor having a high accuracy with a small detection error. However, such a measure is difficult to realize because of the increases in the cost of the precharge control apparatus.

It is thus desired to provide a precharge control apparatus that determines completion of precharge based on the voltage difference between the battery voltage and the capacitor voltage more reliably without incurring cost increases by selecting a main contactor or voltage sensor.

An example of the present disclosure described herein is set forth in the following clauses.

According to an example of the present disclosure, a precharge control apparatus is provided to include a main contactor, a capacitor, a precharge contactor, a voltage sensor, and a controller.

The main contactor is provided in a power supply path from a battery to a load. The capacitor is connected in parallel to the load to smooth the voltage fluctuation. The precharge contactor is connected in parallel to the main contactor via a current limiting resistor. The voltage sensor is configured to detect each of a battery voltage and a capacitor voltage. Here, the voltage sensor may be provided as a battery voltage sensor detecting a battery voltage and a capacitor voltage sensor detecting a capacitor voltage.

Then, the controller closes the precharge contactor to start the precharge of the capacitor. In addition, after starting the precharge, there may be an event that a set time has elapsed from when the voltage difference between the battery voltage and the capacitor voltage detected by the voltage sensor becomes equal to or less than a set voltage. In response to such an event, it is determined that the precharge is completed, and the main contactor is thereby closed.

Of parameters used in the determination of the precharge completion by the controller, a set voltage is calculated or set based on a maximum error obtained by adding the maximum values of the detection errors of the battery voltage and capacitor voltage by the voltage sensor.

In addition, a set time is calculated or set on the assumption that the capacitor voltage is increased due to the precharge with a time constant when each of the resistance value of the resistor and the capacitance of the capacitor is the largest within the allowable range. In other words, the set time is set based on the time (i.e., period of time) from when the voltage difference reaches a voltage value that is twice the maximum error to when the voltage difference becomes equal to or less than the withstand voltage of the main contactor while the capacitor voltage increases due to the precharge.

That is, the capacitor is subjected to the precharge process in order to charge the capacitor in advance so that, when the main contactor is closed, the voltage difference between the battery voltage and the capacitor voltage is equal to or less than the withstand voltage of the main contactor.

Therefore, the precharge completion determination is only required to determine that the voltage difference between the battery voltage and the capacitor voltage is equal to or less than the withstand voltage of the main contactor even if there are variations in the detection accuracy of the voltage sensor and the characteristics of the resistor and the capacitor.

Therefore, the precharge control apparatus of the example of the present disclosure sets the set voltage based on the maximum error obtained by adding the maximum values of the detection errors of the battery voltage and the capacitor voltage by the voltage sensor. It is thus possible to detect that the voltage difference is within the maximum error.

In addition, suppose a case where the voltage difference between the battery voltage and the capacitor voltage drops to the set voltage due to precharge. In such a case, when considering the detection error of the battery voltage and the capacitor voltage, the actual voltage difference is within a range from zero to a voltage value twice the maximum error.

Thus, the time required for the voltage difference to change from the voltage value twice the maximum error to the withstand voltage of the main contactor is calculated or obtained under a state where the precharge causes the capacitor voltage to rise with the time constant when the resistance value of the resistor and the capacitance of the capacitor are the largest within the tolerance. Then, this time is set as a set time from when the voltage difference reaches the set voltage in the precharge execution to when the completion of precharge determination is made.

Therefore, according to the precharge control apparatus of the example of the present disclosure, the completion of the precharge can be determined even when the detection accuracy of the voltage sensor for detecting the battery voltage and the capacitor voltage is low and the error of the voltage difference between these voltages is the largest within the allowable error range.

Further, according to the precharge control apparatus of the example of the present disclosure, it is not necessary to select a main contactor having a high withstand voltage or a voltage sensor having a high accuracy with a small detection error. Therefore, it is possible to realize a precharge control apparatus that can perform the precharge completion determination more reliably without incurring a cost increase.

What is claimed is:

1. A precharge control apparatus comprising:
    a main contactor provided in a power supply path from a battery to a load;
    a smoothing capacitor connected in parallel to the load;
    a precharge contactor connected in parallel to the main contactor via a current limiting resistor;
    a voltage sensor configured to detect a battery voltage of the battery and a capacitor voltage of the capacitor; and
    a controller configured to
        start a precharge of the capacitor by closing the precharge contactor,
        determine that the precharge of the capacitor is completed in response to that a set time has elapsed from when a voltage difference between the battery voltage and the capacitor voltage detected by the voltage sensor becomes equal to or less than a set voltage, and
        close the main contactor upon determining that the precharge of the capacitor is completed,
            the set voltage being set based on a maximum error obtained by adding a maximum value of a detection error of the battery voltage by the voltage sensor and a maximum value of a detection error of the capacitor voltage by the voltage sensor,
            the set time being set based on a time from when the voltage difference becomes twice the maximum error to when the voltage difference becomes equal to or less than a withstand voltage of the main contactor, under a state where the precharge causes the capacitor voltage to increase with a time constant when a resistance value of the current limiting resistor and a capacitance of the capacitor each are largest within an allowable error.

2. The precharge control apparatus according to claim 1, wherein:

in response to the voltage difference greater than the set voltage continuing for a preset first determination time or longer from when the precharge is started, the controller is configured to determine that an abnormality has occurred in the voltage sensor, the power supply path, or the load, to open the precharge contactor.

3. The precharge control device according to claim 1, wherein:

in response to the set time having elapsed from when the voltage difference becomes equal to or less than the set voltage after the precharge is started, the controller is configured to determine whether a current flowing from the battery towards the load is equal to or less than a preset threshold current; and in response to determining that the current is equal to or less than the threshold current, the controller is configured to determine that the precharge of the capacitor is completed, and close the main contactor.

4. The precharge control device according to claim 3, wherein:

in response to determining that the current is greater than the threshold current, the controller is configured to determine whether the current greater than the threshold current continues for a preset second determination time or longer; and in response to determining that the current greater than the threshold current continues for the second determination time or longer, the controller is configured to determine that an abnormality has occurred in the voltage sensor, or the load and open the precharge contactor.

5. The precharge control device according to claim 1, further comprising:

a different main contactor in addition to the main contactor, wherein:

the main contactor is provided in a one of the two power supply paths;

the different main contactor is provided in a different one of the two power supply paths;

the two power supply paths connect (i) between the load and a positive electrode side of the battery and (ii) between the load and a negative electrode side of the battery, respectively; and in response to closing the main contactor in the one of the two power supply paths or the precharge contactor in the one of the two power supply paths, or both the main contactor and the precharge contactor in the one of the two power supply paths, the controller is configured to close the different main contactor to make the different one of the two power supply paths conductive.

* * * * *